June 13, 1933. G. GERALDSON 1,914,117
TRACTOR IMPLEMENT
Filed Sept. 19, 1931
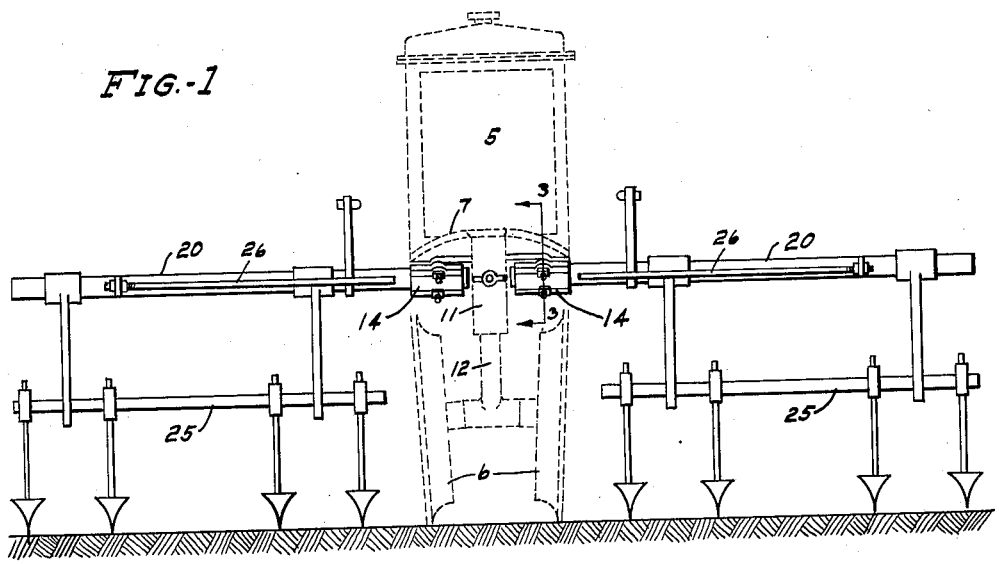
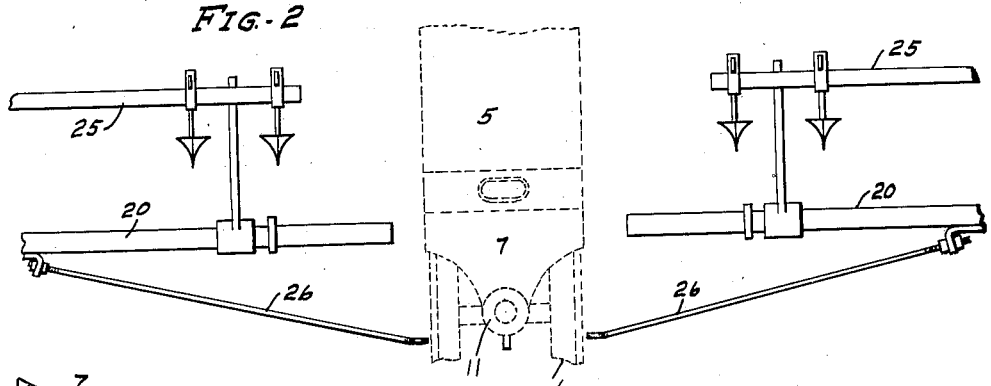
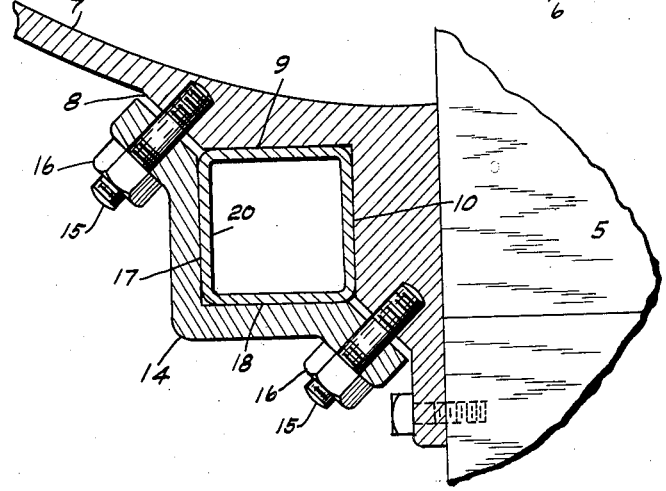
INVENTOR.
GERALD GERALDSON
BY James A. Walsh
ATTORNEY Patented June 13, 1933

1,914,117

UNITED STATES PATENT OFFICE

GERALD GERALDSON, OF RACINE, WISCONSIN, ASSIGNOR TO J. I. CASE COMPANY, OF RACINE, WISCONSIN, A CORPORATION

TRACTOR IMPLEMENT

Application filed September 19, 1931. Serial No. 563,751.

My invention relates to means for attaching a cultivator or other implement frame to a tractor in a simple and ready manner and which equipment may be as readily detached so that the tractor may be used for other purposes. In attachments of this character it is the practice to employ a bar of considerable length passing in front of or beneath the tractor for supporting implement equipments such as cultivator gangs, planters and the like, at each side of the body thereof, necessitating the removal of the attachment at one side before the oppositely implement equipped bar can be withdrawn, and because of the undue length of such bar the removal of the implement parts therefrom is difficult and some of which may be mislaid or lost when the tractor is so dismantled outdoors as is common, and it is the object of my invention to obviate these difficulties and losses.

In the accompanying drawing, forming part hereof, Figure 1 is a front elevation of a tractor equipped (for illustrative purposes) with cultivator gangs mounted upon supporting bars extending from opposite sides of the tractor; Fig. 2, a plan view showing the bars detached from the tractor; and Fig. 3 is a detail section taken on the dotted line 3—3 in Fig. 1.

In said drawing, the numeral 5 indicates a tractor, and 6 the steering wheels thereof, which may be of any desired construction and arrangement. To the body of said tractor I secure a casting or bracket 7 inclined, at 8, on its under side and provided with walls 9, 10, at right angles to each other, as indicated in Fig. 3, or of other formation, said bracket preferably terminating in a socket member 11 in which the vertical shaft 12 of the steering wheels 6 is mounted to swivel. To the under side of the bracket I detachably secure keepers 14 by means of stud bolts 15 and nuts 16, one of said keepers being at each side of the bracket and each provided with walls 17, 18, at right angles to each other or of other formation to correspond to the opposite bearing surface of bracket 7, so that when assembled with bracket 7, as indicated in Fig. 3, an angular or other suitable opening will be provided for the retention of a tubular or other bar 20 extending laterally in relation to the tractor, one of said bars being at each side thereof.

By employing a separate bar extending from each side of the tractor I am enabled to attach thereto cultivator gangs 25 or other implements in a manner to constitute a unitary structure so that in entirety the same may be quickly attached to a tractor by inserting the end of said bar into the opening formed by the bracket 7 and keeper 14, and by tightening the nuts 16 the bar will be fixedly secured in position, and it will be understood that in dismantling the tractor the bars and their attachments can be readily removed as units and ready for re-attachment whenever desired. In order to provide a stable assemblage of the parts I may also employ one or more tie-rods, as 26, connected to the bars 7 and to the socket member 11 or bracket 7, so that the bars may be maintained in alignment and resist the strain imparted by earth working tools when in field operations.

As indicated, a tractor equipped with implement parts supported at each side thereof by independent bars detachably secured to the tractor may be quickly dismantled, and the equipments supported by the bars forming unitary structures for opposite sides of the tractor may be laid aside intact or stored for future use within limited space as one unit may be piled upon another.

I claim as my invention:

1. The combination, with a tractor, of an implement equipment including a supporting bar, a bracket secured to the tractor and recessed in its under side and terminating in a socket member for swivelingly supporting a steering wheel, a keeper recessed to correspond with the recess in said bracket whereby a socket is provided for the reception of the supporting bar, and means for detachably securing the keeper and bracket together to bind said bar and maintain the same laterally extending in relation to the tractor and whereby the implement and said bar as a unit may be attached to and removed from the tractor.

2. The combination, with a tractor, of a bracket member including sockets in its sides and a bearing for supporting a vertical axle having a steering wheel mounted thereon, implement equipments each including a supporting bar mounted in said sockets respectively and extending laterally from the tractor, and means for securing said bars in the sockets whereby the implement at each side of the tractor with its supporting bar may be attached and removed as a unitary structure.

In testimony whereof I affix my signature.

GERALD GERALDSON.